Patented Feb. 27, 1945

2,370,524

UNITED STATES PATENT OFFICE 2,370,524

MANUFACTURE OF ORTHO-NITRO-ANISOLE

Mortimer C. Denison and Mason E. Wassom, Wilmington, Del., assignors to E. I. du Pont de Nemours & Company, Wilmington, Del., a corporation of Delaware No Drawing. Application June 24, 1944, Serial No. 542,026

7 Claims. (Cl. 260—612)

This invention relates to processes for manufacturing ortho-nitro-anisole, and especially to a new process in which ortho-nitro-anisole is manufactured by methoxylating ortho-nitro-chlorobenzene.

Ortho-nitro-anisole has been made heretofore by a process of methoxylation wherein ortho-nitro-chloro-benzene dissolved in methanole was heated to a suitable temperature in the presence of a large excess of alkali until the chloro group was replaced by methoxy. In an improved procedure (U. S. P. 2,056,260, Dahlen, Clapp and Jordan) the use of such large excesses of alkali are avoided by adding portions of sodium hydroxide at intervals during the reaction. These processes accomplish the substitution of the methoxy group, but for some unexplained reason the results of the processes are not entirely uniform in that the products have low freezing points and they are sometimes discolored.

It is among the objects of the present invention to provide improvements in processes for manufacturing ortho-nitro-anisole wherein more uniform results are obtainable. Another object of the invention is to provide processes which will produce ortho-nitro-anisole in good quality and yield. Other objects will be apparent from the following more detailed description.

The objects of the present invention are attained in general by heating ortho-nitro-chloro benzene in alkaline methanol solution in the presence of a sub-divided form of an insoluble silicate, at a suitable temperature until the chloro group is replaced by methoxy.

The invention will be more fully set forth in the following more detailed description which includes examples that are given as illustrative embodiments of the invention and not as limitations thereof. Parts are expressed in parts by weight unless otherwise noted.

Example I

An alkaline batch consisting of 3 parts of ortho-nitro-chloro benzene dissolved in 9.3 parts of methanol, 0.5 part of flake sodium hydroxide (prepared from soda ash) and 0.013 part of powder of about 50–100 mesh, made by heating vermiculite until it is fully expanded and then grinding, is mixed in a container and heated with stirring to 67° C. At half-hour intervals a 50% water solution of sodium hydroxide is added to the batch to maintain an alkalinity equivalent to 0.75–0.77 normal for the first six hours, about 0.95–0.97 normal for the second six hours and about 1.10–1.12 at the end of the third six hours. The alkali required in these additions is about one part of sodium hydroxide. The reaction is completed at the end of about 36 to 48 hours of heating, and the heating is then discontinued. The batch is then cooled and sulfuric acid is added until the mixture is faintly alkaline to Brilliant Yellow paper. The excess of alcohol is distilled from the faintly alkaline mixture, leaving a residue containing the ortho-nitro-anisole. The residue is washed repeatedly with hot water and the oil consisting of ortho-nitro-anisole is separated from the water in good yield. The ortho-nitro-anisole thus produced is a light yellow-colored liquid at ordinary atmospheric temperatures, having a freezing point of 9.5°–10° C. The process consistently gives the results indicated.

Similar desirable results are obtained by adding the same proportion of ground-expanded vermiculite in four portions, namely when the heating is started and at the end of each succeeding six or eight hours.

Example II

Either modification of the process of Example I is carried out whilst bubbling a slow stream of air through the reaction mixture during the heating period. For instance, when a 1000 gal. kettle was used, a rate of about 0.3 to about 0.6 cubic feet of air per minute was found satisfactory. The presence of the oxygen of the air tends to give a slight improvement in the color and melting point of the product.

Example III

Either modification of the process of Example I is carried out using powdered bentonite of about 50 mesh instead of ground-expanded vermiculite. Good and consistent results similar to those of Example I are obtained.

Other silicate materials can be used instead of the mixed magnesium and aluminum silicate which constitutes the principal ingredient of vermiculite and bentonite. Powdered magnesium silicate or powdered aluminum silicate or clay consisting principally of aluminum silicate are operable catalytic agents. For satisfactory results the powdered silicate catalyst should be present in the reaction mixture in excess of about 0.1% of the weight of the nitro-chloro-benzene treated. About 0.5% of the catalyst as compared to the weight of the nitro-chloro-benzene treated is preferred. Any excess of the silicate over the preferred amount can be used and similar results are obtained as long as the mixture continues to be a fluid suspension, although no additional advantage appears to accrue from the use of such excesses.

Although hereinbefore the invention has been described with reference to the preferred form of the process, in which part of the caustic is added in increments during the course of the reaction, the addition of the magnesium and aluminum silicates has a similar beneficial effect upon the formation in general of ortho-nitro-anisole from ortho-nitro-chloro-benzene in all alkaline methanol solutions. For example, the ortho-nitro-chloro-benzene, methanol and vermiculite of Example I may be treated at the beginning of the reaction with all of the sodium hydroxide called for in the example, with the result that the quality of the nitroanisole is improved over that obtained when no vermiculite is used. It is preferred, however, to provide a slightly increasing alkalinity during the reaction by suitable additions of caustic. Although the initial alkalinity and the rate at which it is increased may be varied widely, the procedure followed in the examples is particularly preferred. Similarly, considerable variation is possible in the temperature of the reaction. Thus it is possible to start the reaction at about 55° and raise it to 70° as the reaction proceeds. Below about 55°, however, the reaction is undesirably slow, while above about 80° large amounts of undesired products are formed. All factors being considered, such as yield, speed of reaction and quality of product, a reaction temperature of about 67° C. is preferred.

From the foregoing disclosure it will be recognized that the invention is susceptible of modification without departing from the spirit and scope thereof and it is to be understood that the invention is not restricted to the specific illustrations thereof herein set forth.

We claim:

1. In the process of manufacturing ortho-nitro-anisole by heating an alkaline methanol solution of ortho-nitro-chloro-benzene to methoxylation temperature in the presence of sodium hydroxide, the step which comprises adding to the reaction mixture the powder of an insoluble silicate comprising the silicate of a metal of the group consisting of magnesium and aluminum, said powder being present during the methoxylation, the total amount added being in excess of about 0.1% of the weight of the ortho-nitro-chloro-benzene treated and not in amount sufficient to render the mixture non-fluid.

2. The process in accordance with claim 1 in which the reaction mixture is heated to about 67° C.

3. In the process of manufacturing ortho-nitro-anisole which comprises heating a fluid alkaline methanol solution of ortho-nitro-chloro-benzene in the presence of sodium hydroxide and maintaining an excess of alkali by occasional additions of sodium hydroxide during the heating until the ortho-nitro-chloro-benzene is methoxylated, the step which comprises adding to the reaction mixture the powder of an insoluble silicate comprising the silicate of a metal of the group consisting of magnesium and aluminum, said powder being present during the methoxylation, the total amount added being in excess of about 0.1% of the weight of the ortho-nitro-chloro-benzene treated and not in amount sufficient to render the mixture non-fluid.

4. In the process of manufacturing ortho-nitro-anisole which comprises heating to about 67° C. an alkaline methanol solution of ortho-nitro-chloro-benzene in the presence of sodium hydroxide and maintaining the alkali concentration at about 0.77 normal for the first six hours by the occasional addition of sodium hydroxide solution in water, raising the alkali concentration to and maintaining it about 0.97 normal for the next six hours of heating, again raising the alkali concentration to and maintaining it at about 1.12 normal for the third six hours of heating and then continuing the heating until the reaction is completed, the step which comprises adding to the reaction mixture the powder of an insoluble silicate comprising the silicate of a metal of the group consisting of magnesium and aluminum, said powder being present during the methoxylation, the total amount added being in excess of about 0.1% of the weight of the ortho-nitro-chloro-benzene treated and not in amount sufficient to render the mixture non-fluid.

5. In the process of manufacturing ortho-nitro-anisole which comprises heating to about 67° C. a methanol solution of ortho-nitro-chloro-benzene in the presence of sodium hydroxide and maintaining the alkali concentration at about 0.77 normal for the first six hours by the occasional addition of sodium hydroxide solution in water, raising the alkali concentration to and maintaining it about 0.97 normal for the next six hours of heating, again raising the alkali concentration to and maintaining it at about 1.12 normal for the third six hours of heating and then continuing the heating until the reaction is completed, the steps which comprise slowly adding oxygen to the reaction mixture during the heating and adding to the reaction mixture the powder of an insoluble silicate of a metal of the group consisting of magnesium and aluminum, said powder being present during the methoxylation, the total added being in excess of about 0.1% of the weight of the ortho-nitro-chloro-benzene treated and not in amount sufficient to render the mixture non-fluid.

6. The process in accordance with claim 4 in which the insoluble silicate consists of a powder made by heating vermiculite until it is expanded and then sub-dividing the resulting material.

7. The process in accordance with claim 4 in which the insoluble silicate consists of powdered bentonite.

MORTIMER C. DENISON.
MASON E. WASSOM.